(12) United States Patent
Shenoy et al.

(10) Patent No.: US 8,688,491 B1
(45) Date of Patent: Apr. 1, 2014

(54) TESTING AND ERROR REPORTING FOR ON-DEMAND SOFTWARE BASED MARKETING AND SALES

(75) Inventors: Rohit Shenoy, Stoughton, MA (US); Pieter J. Mosterman, Framingham, MA (US); Bella G. Teverovsky, Brookline, MA (US); John Fluet, Sudbury, MA (US); Craig Dowley, Franklin, MA (US)

(73) Assignee: The Mathworks, Inc., Natick, MA (US)

( * ) Notice: Subject to any disclaimer, the term of this patent is extended or adjusted under 35 U.S.C. 154(b) by 290 days.

(21) Appl. No.: 13/179,989

(22) Filed: Jul. 11, 2011

Related U.S. Application Data

(62) Division of application No. 11/238,721, filed on Sep. 29, 2005, now Pat. No. 7,996,255.

(51) Int. Cl.
*G01R 31/28* (2006.01)
*G06Q 10/00* (2012.01)

(52) U.S. Cl.
USPC ............................. 705/7.11; 714/48; 714/46

(58) Field of Classification Search
USPC ...................................... 705/7.11; 714/48, 46
See application file for complete search history.

(56) References Cited

U.S. PATENT DOCUMENTS

| | | | |
|---|---|---|---|
| 5,233,611 A * | 8/1993 | Triantafyllos et al. ........... | 714/46 |
| 5,237,677 A * | 8/1993 | Hirosawa et al. ................ | 714/57 |
| 5,371,883 A * | 12/1994 | Gross et al. .................... | 714/38.1 |
| 5,497,479 A | 3/1996 | Hornbuckle | |
| 5,566,339 A * | 10/1996 | Perholtz et al. ................ | 713/340 |
| 5,708,709 A | 1/1998 | Rose | |
| 5,731,991 A | 3/1998 | Kinra et al. | |
| 5,812,780 A * | 9/1998 | Chen et al. ..................... | 709/224 |
| 5,832,449 A | 11/1998 | Cunningham | |
| 5,883,954 A | 3/1999 | Ronning | |
| 5,883,955 A | 3/1999 | Ronning | |
| 5,907,617 A | 5/1999 | Ronning | |
| 5,949,415 A | 9/1999 | Lin et al. | |
| 5,950,172 A | 9/1999 | Klingman | |
| 6,002,871 A * | 12/1999 | Duggan et al. ................. | 717/135 |
| 6,018,619 A * | 1/2000 | Allard et al. ................... | 709/224 |
| 6,061,643 A * | 5/2000 | Walker et al. .................. | 702/123 |
| 6,167,308 A * | 12/2000 | DeGroot .......................... | 607/14 |

(Continued)

FOREIGN PATENT DOCUMENTS

| | | |
|---|---|---|
| EP | 0679977 A1 | 11/1995 |
| JP | 408194748 A | 7/1996 |

(Continued)

OTHER PUBLICATIONS

Ebert, Christof et al., Bugzilla, ITracker and Other Bug Trackers IEEE Software, Mar./Apr. 2005.*

(Continued)

*Primary Examiner* — Scott L Jarrett
(74) *Attorney, Agent, or Firm* — Harrity & Harrity, LLP

(57) ABSTRACT

Business management methods for on-demand trial based marketing and sales are introduced. Using on-demand trial technology, usage metrics can be automatically generated by tracking the usage of specific products and corresponding duration. Usage metrics and other data are automatically processed to qualify and channel leads to pertinent categories in sales and marketing. The present invention facilitates a more directed effort to investigate leads and makes the information of customers available for follow-up that has higher prospective sales potential. The present invention may also be used to dispatch pre-release reports automatically to a vendor.

18 Claims, 7 Drawing Sheets

(56) References Cited

U.S. PATENT DOCUMENTS

| | | | |
|---|---|---|---|
| 6,222,535 B1* | 4/2001 | Hurd, II | 715/733 |
| 6,236,977 B1 | 5/2001 | Verba et al. | |
| 6,236,990 B1 | 5/2001 | Geller et al. | |
| 6,301,701 B1* | 10/2001 | Walker et al. | 717/125 |
| 6,304,982 B1* | 10/2001 | Mongan et al. | 714/38.14 |
| 6,344,738 B1* | 2/2002 | Garcia et al. | 324/212 |
| 6,360,332 B1* | 3/2002 | Weinberg et al. | 714/4.1 |
| 6,473,707 B1* | 10/2002 | Grey | 702/123 |
| 6,510,402 B1* | 1/2003 | Logan et al. | 702/186 |
| 6,587,969 B1* | 7/2003 | Weinberg et al. | 714/46 |
| 6,606,704 B1 | 8/2003 | Adiletta et al. | |
| 6,606,744 B1 | 8/2003 | Mikurak | |
| 6,611,955 B1* | 8/2003 | Logean et al. | 717/128 |
| 6,745,184 B1 | 6/2004 | Choi et al. | |
| 6,799,123 B2* | 9/2004 | Hughes | 702/25 |
| 6,810,494 B2* | 10/2004 | Weinberg et al. | 714/46 |
| 6,862,696 B1 | 3/2005 | Voas et al. | |
| 6,868,389 B1 | 3/2005 | Wilkins et al. | |
| 6,968,509 B1* | 11/2005 | Chang et al. | 715/802 |
| 6,993,747 B1* | 1/2006 | Friedman | 717/124 |
| 7,020,797 B2* | 3/2006 | Patil | 714/4.4 |
| 7,055,067 B2* | 5/2006 | DiJoseph | 714/38.1 |
| 7,055,137 B2* | 5/2006 | Mathews | 717/125 |
| 7,092,907 B2 | 8/2006 | Kanevsky et al. | |
| 7,159,146 B2* | 1/2007 | Bowers et al. | 714/37 |
| 7,167,909 B2 | 1/2007 | Yamamoto | |
| 7,191,363 B2* | 3/2007 | Chang | 714/38.14 |
| 7,197,427 B2* | 3/2007 | Noonan et al. | 702/179 |
| 7,216,132 B1* | 5/2007 | Flam | 1/1 |
| 7,231,549 B1* | 6/2007 | Rhea et al. | 714/25 |
| 7,283,830 B2 | 10/2007 | Buckley | |
| 7,330,822 B1* | 2/2008 | Robson et al. | 705/7.15 |
| 7,373,524 B2 | 5/2008 | Motsinger et al. | |
| 7,418,405 B1 | 8/2008 | Utter et al. | |
| 7,444,548 B2* | 10/2008 | Shane | 714/38.14 |
| 7,458,064 B2* | 11/2008 | Potts et al. | 717/124 |
| 7,506,318 B1* | 3/2009 | Lindo et al. | 717/130 |
| 7,526,439 B2 | 4/2009 | Freishtat et al. | |
| 7,546,248 B2 | 6/2009 | Ellison et al. | |
| 7,567,979 B2* | 7/2009 | Prasad et al. | 1/1 |
| 7,657,872 B2* | 2/2010 | Kelbaugh et al. | 717/124 |
| 7,673,179 B2* | 3/2010 | LaBanca et al. | 714/38.14 |
| 7,673,181 B1* | 3/2010 | Lindo et al. | 714/38.13 |
| 7,680,917 B2* | 3/2010 | Silvert | 709/223 |
| 7,694,181 B2* | 4/2010 | Noller et al. | 714/38.11 |
| 7,698,688 B2* | 4/2010 | Fujiwara et al. | 717/126 |
| 7,716,322 B2* | 5/2010 | Benedikt et al. | 709/224 |
| 7,730,005 B2* | 6/2010 | Gilliam et al. | 706/45 |
| 7,739,551 B2* | 6/2010 | Eickmeyer et al. | 714/38.1 |
| 7,751,801 B2 | 7/2010 | Torvinen | |
| 7,788,540 B2* | 8/2010 | Merriman et al. | 714/38.14 |
| 7,823,138 B2* | 10/2010 | Arguelles et al. | 717/131 |
| 7,844,861 B2* | 11/2010 | Hegarty et al. | 714/46 |
| 7,890,814 B2* | 2/2011 | Zhang et al. | 714/45 |
| 7,996,255 B1 | 8/2011 | Shenoy et al. | |
| 2002/0087950 A1* | 7/2002 | Brodeur et al. | 717/124 |
| 2003/0074323 A1 | 4/2003 | Catan | |
| 2003/0083962 A1 | 5/2003 | Araki et al. | |
| 2003/0139193 A1 | 7/2003 | Buckley | |
| 2003/0167195 A1 | 9/2003 | Fernandes et al. | |
| 2004/0041827 A1* | 3/2004 | Bischof et al. | 345/704 |
| 2004/0059809 A1* | 3/2004 | Benedikt et al. | 709/224 |
| 2004/0093268 A1 | 5/2004 | Ramchandani et al. | |
| 2004/0225553 A1 | 11/2004 | Broady et al. | |
| 2005/0097516 A1* | 5/2005 | Donnelly et al. | 717/124 |
| 2005/0246241 A1 | 11/2005 | Irizarry et al. | |
| 2006/0101404 A1* | 5/2006 | Popp et al. | 717/124 |
| 2007/0043609 A1 | 2/2007 | Imam et al. | |
| 2007/0114279 A1 | 5/2007 | Lessing et al. | |
| 2007/0168971 A1* | 7/2007 | Royzen et al. | 717/124 |
| 2007/0255614 A1 | 11/2007 | Ourednik et al. | |
| 2008/0027787 A1 | 1/2008 | Malsbenden et al. | |

FOREIGN PATENT DOCUMENTS

| | | |
|---|---|---|
| JP | 2002-006970 A | 1/2002 |
| WO | WO 95/34857 A | 12/1995 |
| WO | WO 98/04083 A | 1/1998 |

OTHER PUBLICATIONS

Choosing an Issue Tracking and Change Management Tool—White Paper Merant PVCS, 1999, Retrieved from Archive.org.*

Merant PVCS Tracking—Issue and Change Management Solution—Reviewer's Guide Merant PVCS, Aug. 2000, Retrieved from Archive.org.*

TrackWise—User's Guide Sparta Systems, Inc., 2000.*

WinRunner 7.0—User's Guide (online guide) Mercury Interactive, 2000, ISBN-10: 0971352194.*

Thinter.net Announces TestDrive Online; Patent-Pending Combinatino of Technologies Solves Software Demo Problem Business Wire, May 24, 2000.*

Runaware.com Web Pages Runaware, 2001, Retrieved from Archige.org Jan. 19, 2010.*

Barnson, Matthew, The Bugzilla Guide—2.16.3 Release Mozilla. org, Apr. 23, 2003.*

Smith, Guy Edward, Continuous Testing MangoSoft Corporation, Jun. 15, 2000.*

Client-server model definition Wikipedia.org, Retrieved Mar. 5, 2012.*

Multitier architecture definition Wikipedia.org, Retrieved Mar. 5, 2012.*

Runaware.com, "Online tests of software pass the one million mark", Nov. 16, 2004, 3 pages.

Runaware.com, "FileMaker selects Runware's online evaluation system for FileMaker Pro 7 and partner solutions", Aug. 18, 2004, 3 pages.

Hilbert et al., "Agents for Collecting Application Usage Data Over the Internet", Proceedings of the second international conference on Autonomous Agents, May 10-13, 1998, 8 pages.

LeadTrack.com, "LEADTrack Software", Feb.-Mar. 2000, 62 pages.

Runaware.com, "Accelerate your sales by making your software available, for instant, trouble-free customer evaluation and demonstration", Dec. 2003, 4 pages.

Kim et al., "Combination of muiltiple classifiers for the customer's purchase behavior prediction Decision Support Systems", vol. 34, 2002, pp. 167-175.

Darrow, "VARs embrace new app metering tools Computer Reseller News", No. 595, Sep. 12, 1994, 2 pages.

* cited by examiner

300

302

Salutation     *First Name     Middle Name
[-select one- ▼] [_____] [_____]

*Last Name
[_____]

Title
[_____]

Department     Mail Stop
[_____] [_____]

*Company/University
[_____]

*Street Address 1
[_____]

Street Address 2
[_____]

*City     State/Province (US & CA only)
[_____] [-select one- ▼]

*Zip/Postal Code     County/Province
[_____] [_____]

*Country
[-select one- ▼]

*E-mail (Format must be eg. name@yourdomain.com)
[_____]

Telephone
*Area/City Code     *Main Number     Extension
[_____] [_____] [_____]

Fax
Area/City Code     Main Number
[_____] [_____]

304

Have you used MATLAB?
Yes ☐     No ☐
Have you used MATLAB in the last:
week? ☐
month? ☐
year? ☐

Which best describes your application?
[-select one- ▼]

Which best describes your industry?
[-select one- ▼]

What other types of development software do you use?
☐ Fortran            ☐ C/C++
☐ Mathcad          ☐ Excel
☐ IDL                ☐ Other
☐ Mathmatica

306

[Submit]    We will not sell or rent your personal contact information. See our privacy policy for details.

*Fig. 3*

| User Profile | 312 |
|---|---|
| Name: | John Doe Jr. |
| Email Address: | John Doe@doesinc.com |
| Access Number: | 123654 |
| Job Title: | Senior Controls Algorithm Engineer |
| Company | Ford Motor Company |
| Industry/Industries | Automotive - Powertrain |
| Application(s) | Controls Algorithm Design, Plant Modeling |
| Products Purchased: | MATLAB, Simulink, SimMechanics, SimDriveline, Control System Toolbox, Simulink Control Design |
| Products Under Maintenance: | MATLAB, Simulink, SimDriveline, Control System Toolbox, Simulink Control Design |
| Technical Support Question Types | Plant Modeling, Linearization, Controls Algorithm Development |
| User Requested Product Info | Simulink Control Design Simulink Response Optimization |

*Fig. 4*

Trial Prospect Report

*Prospect Score: 90/100*

*Recommended Next Step - Call within 30 minutes*

| Prospect Name: | John Doe Jr. |
|---|---|
| Prospect Address: | 31 Pinto Way, Pontiac Drive, Detroit, MI |
| Prospect Access Number: | 123654 |
| Prospect Licenses: | Click here for a complete list |
| Currently Licensed Products: | MATLAB |
| Requested Product Information (Y/N): | Y |
| List of Products in Request: | Simulink<br>Real-Time Workshop |

Trial Specific Data:

| Length of Trial: | 55 minutes |
|---|---|
| Products Tried and Length of Time/Product: | MATLAB - 55 minutes<br>Simulink - 52 minutes<br>Stateflow - 45 minutes<br>Real-Time Workshop - 35 minutes<br>Simulink Fixed Point - 25 minutes<br>Real-Time Workshop Embedded Coder - 20 minutes |
| Industry Profile: | Automotive<br>  Powertrain and Engine |
| Application Profile: | Embedded Control Software<br>  Modeling and Simulation<br>  Software Engineering |

*Fig. 5*

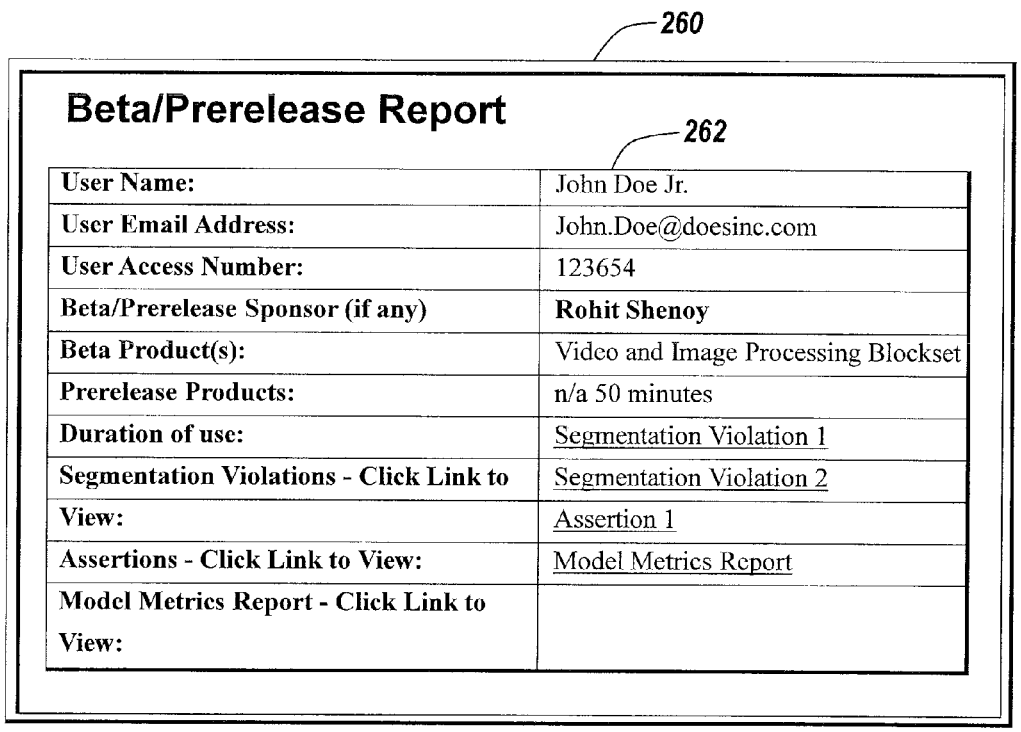

Beta/Prerelease Report

| | |
|---|---|
| User Name: | John Doe Jr. |
| User Email Address: | John.Doe@doesinc.com |
| User Access Number: | 123654 |
| Beta/Prerelease Sponsor (if any) | Rohit Shenoy |
| Beta Product(s): | Video and Image Processing Blockset |
| Prerelease Products: | n/a 50 minutes |
| Duration of use: | Segmentation Violation 1 |
| Segmentation Violations - Click Link to View: | Segmentation Violation 2 |
| Assertions - Click Link to View: | Assertion 1 |
| Model Metrics Report - Click Link to View: | Model Metrics Report |

*Fig. 7*

TESTING AND ERROR REPORTING FOR ON-DEMAND SOFTWARE BASED MARKETING AND SALES

RELATED APPLICATIONS

This application is a divisional of U.S. patent application Ser. No. 11/238,721, filed Sep. 29, 2005, now issued as U.S. Pat. No. 7,996,255 on Aug. 9, 2011, the contents of which have been incorporated herein.

TECHNICAL FIELD

The present invention relates to a method of pre-release testing, marketing and sales of a software product.

BACKGROUND INFORMATION

Conventionally when a potential customer contacts a sales representative of a software vendor for a trial version of a software product, the sales representative will either send the customer a trial version of the software product via mail using a compact disc or provide the potential customer a link to download a trial version of the software product from the Internet. The software product is then locally installed on the computer of the potential customer. The customer may or may not provide feedback to the sales representative. Therefore, the sales representative usually needs to contact the potential customer to find out how the potential customer liked the trial version of the software product and to determine if the potential customer would have enough interest to purchase the software product. This process is inefficient and cumbersome in evaluating prospective customers.

Additionally, sometimes a vendor releases a pre-release version of a software product to customers for testing. However, the customers rarely report all the problems they encounter in the pre-release software. Sometimes although a customer reports to a developer a problem that the customer encounters, but since the customer does not remember how the problem occurs, the developer may not be able to remedy the problem.

SUMMARY OF THE INVENTION

The present invention provides a method to solve the above-mentioned problems. By using on-demand software technology for trials and pre-release applications, usage information can be automatically generated by tracking the usage of the software on the on-demand host server. On-demand software usage does not require local installation of the software. Instead, versions of software products may be accessed remotely through a network and avoid installing a copy of the software product on a computer of the prospective customer. On-demand software is commercially available from a selection of vendors.

Usage metrics, such as time spent, feature used, and type of application built, are available to the vendor from either the hosting facility or by hosting the trials at the vendor site. These metrics may be used to evaluate a prospective customer. These metrics are useful to qualify leads for Sales and Marketing uses. Leads are referred herein to any record of customer contact or activity such as a request for information, a registration for an event, participation in an event like a tradeshow, seminar, webinar, customer visit, response to a flyer or direct mail, or any other potential opportunity for a sale. The present invention facilitates a more directed effort to investigate and qualify leads and makes the information of customers available to the sales and marketing department of the vendor for follow-up that has higher prospective sales potential.

Additionally, the present invention also helps to improve feedback of software undergoing pre-release testing. Pre-release is defined herein as a version of a software that is released to the general public, selected group of customers, or designated developers or testers for use, testing, and evaluation before the official software is released. The pre-release software usually includes official alpha and pre-release version of the software. Conventionally, a developer needs to sit or stand beside a user testing out the pre-release version of a software product and notes down keystrokes and buttons pressed of the user. Therefore, the user has to slow down on his or her interaction with the software to allow enough time for the developer to note down all the necessary information for improving the software. This process is inefficient. Alternatively, a pre-release version of a software product is delivered to a user for installation and testing of the software. In this method, the developer relies on the user to provide feedback for any problems and errors that arise during the testing process. The present invention allows the vendor to record a part of or an entire user session including each keystroke, for a pre-release version of the software product. One advantage of recording a part of or the entire user session for a pre-release software product is that errors, such as assertions and segmentation violations, may be reproduced by a software developer or other engineer involved in the software development cycle, and hence provide a precise picture to the person who reproduces an error how, when, and where the error occur.

In one embodiment of the present invention, a method of using on-demand software for providing leads in marketing and sales is introduced. The method includes the step of providing the user an on-demand trial issued over a network. The method also includes the step of assigning a score according to usage metric of the on-demand trial, wherein the score indicates interest of the user to purchase at least one of the one or more software products included in the trial. The method further includes the step of using information gathered from at least one of the score and the usage metric for a sales purpose.

In one aspect of the present invention, the method further includes the step of based on the score informing a sales representative to contact the user. In another aspect of the present invention, the sales representative is informed to contact the user when the score reaches a pre-determined threshold. In still another aspect of the present invention, the usage of the on-demand trial includes one or more of time spent on testing the on-demand trial, a software product used by the user in the trial, a type of a demo reviewed by the user, or a product feature used in the trial by the user. In yet another aspect of the present invention, the method further includes the step of adjusting the score according to user locale. In still another aspect of the present invention, the method further includes the step of adjusting the score according to user profile. In still another aspect of the present invention, the user profile includes one or more of history of product purchased related to the software, history of other requested trials related to the software, industrial background of the user, a type of technical support question asked by the user, and intended product usage indicated by the user. In yet another aspect of the present invention, the method further includes the step of adjusting the score according to a name that the user uses to name an element of a model, a subsystem, or a block. In still another aspect of the present invention, the method further includes the step of adjusting the score according to a software application installed on a computing device that the user uses to experience the trial.

In still another aspect of the present invention, the method further includes the step of applying a data mining technique to data generated from the trial. In yet another aspect of the present invention, the data mining technique includes, but is not limited to, one or more of neural networks, fuzzy logic, and principal component analysis. In yet another aspect of the present invention, the method also includes the step of mapping at least one of a usage metric or a user profile to an industry model using the data mining technique. In still another aspect of the present invention, the method further includes the step of mapping one or more of a usage metric or a user profile to additional products that the user might be interested in using the data mining technique, wherein the user does not try the additional products in the trial. In yet another aspect of the present invention, the method further includes the steps of generating a report including the score and sending the report to the sales representative. In still another aspect of the present invention, the report further includes one or more of the usage metric and a recommended next step for the sales representative to take. In yet another aspect of the present invention, the step of informing includes sending the sales representative a notification.

In yet another embodiment of the present invention, a method of generating automated pre-release reports by using an on-demand software product is provided. The method includes the step of providing on-demand pre-release software issued over a network for a user for testing and recording an error. The method also includes the step of generating a report including the error. The method further includes the step of dispatching the report to a designated report receiver, such as a developer, of the pre-release software. In one aspect of the present invention, the error is a segmentation violation, an assertion, or an anomalous behavior. In another aspect of the present invention, the method also includes the step of recording usage of the pre-release software, wherein the usage includes at least one of a keystroke, a button pressed, and a product feature used.

In yet another embodiment of the present invention, a storage medium in a computational device, storing a method of using an on-demand trial for providing leads in marketing and sales is introduced. The method includes the step of providing the user an on-demand trial issued over a network. The method also includes the step of assigning a score according to usage metric of the on-demand trial, wherein the score indicates interest of the user to purchase at least one of the one or more software products included in the trial. The method further includes the step of informing a sales representative to contact the user based on the score.

In still another embodiment of the present invention, a storage medium in a computational device, storing a method of generating automated pre-release reports by using on-demand software product is provided. The method includes the step of providing an on-demand pre-release software issued over a network for a user for testing and recording at least one of a segmentation violation or an assertion. The method also includes the step of generating a report including the at least one of the segmentation violation and the assertion. The method further includes the step of dispatching the report to a designated report receiver of the pre-release software. In one aspect of the present invention, the method also includes the step of recording usage of the pre-release software, wherein the usage including at least one of a keystroke, a button pressed, and a product feature used.

In yet another embodiment of the present invention, a system for on-demand marketing and sales is introduced. The system includes the element of a trial software for testing remotely by a user using a network based application, such as a browser. The system also includes the element of a monitor tool for assigning a score to a trial of the trial software participated by the user. The system further includes the element of a report generator for generating a report of the trial. The system also includes the element of a database for retrieving information regarding the user and storing information regarding the trial. In one aspect of the present invention, the system also includes the element of a metric tool for monitoring usage metric of the trial.

The details of various embodiments of the invention are set forth in the accompanying drawings and the descriptions below.

BRIEF DESCRIPTION OF THE FIGURES

The foregoing and other objects, aspects, features, and advantages of the invention will become more apparent from the following description and accompanying drawings.

FIG. 3 illustrates an exemplary sign-up form that is suitable for practicing with one embodiment of the present invention.

FIG. 4 illustrates an exemplary user profile form that is suitable for practicing with one embodiment of the present invention.

FIG. 5 illustrates an exemplary trial report that is suitable for practicing with one embodiment of the present invention.

FIG. 7 illustrates an exemplary pre-release report that is suitable for practicing with one embodiment of the present invention.

DETAILED DESCRIPTION

The present invention provides a method to provide leads for sales and marketing of a software product via the use of on-demand software technology for issuing software trials and demonstrations. On-demand software is software that can be made available to a user over a network, without the need for download or installation of the software on the user's local machine. That is, on-demand software is served remotely. The on-demand software technology enables a user to use a software product by using a web browser and without installation of the software on the user's local machine, however the web browser may need to download a plug-in or a component to enable the user to view the on-demand software. Therefore, the present invention allows the vendor to monitor the trial and note down usage metrics such as time spent and features used. The present invention further provides a method to provide automatic feedback of trials of pre-release software products. One of ordinary skill in the art will appreciate that a user may use a network based application with the present invention and a web browser application is merely used here as an example.

Figure 1:
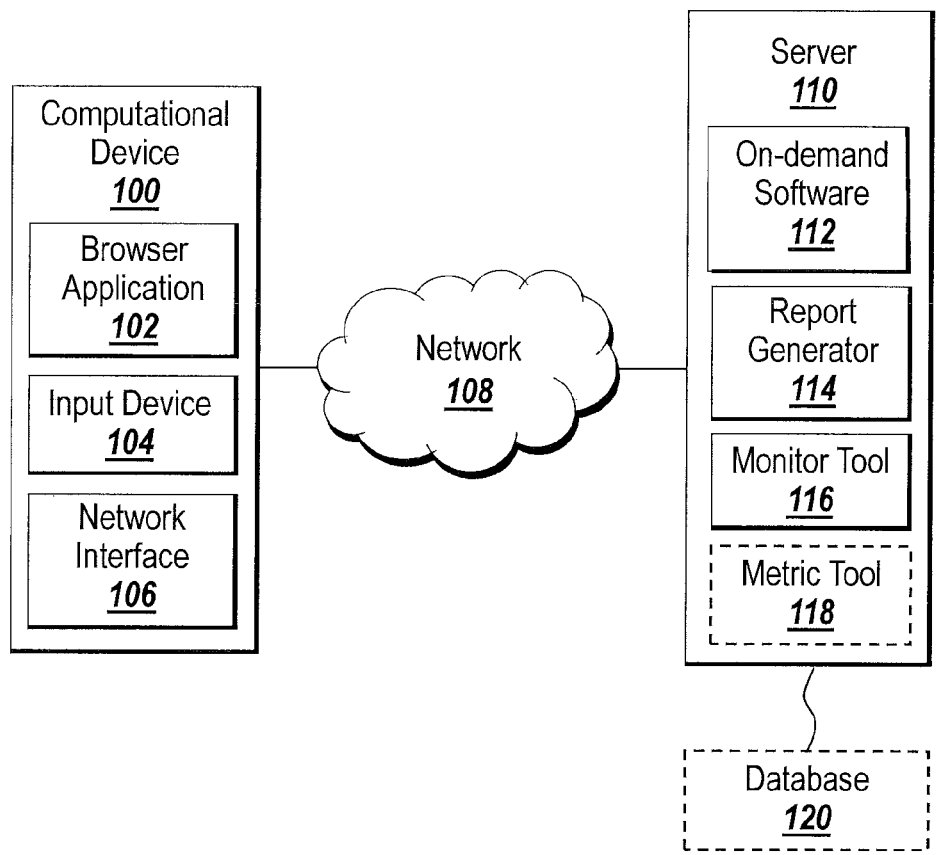
FIG. 1 illustrates a suitable environment for practicing an illustrative embodiment of the present invention.

FIG. 1 illustrates a suitable environment for practicing one embodiment of the present invention. Computational device 100 includes a browser application 102, an input device 104, and a network interface 106. Input device 104 may be a keyboard, a mouse, a stylus, or the like. Computational device 100 may be any computer system such as a desktop computer, laptop, workstation, handheld computer, or the like. Computational device 100 uses network interface 106 to communicate with server 110 via a network 108, such as Local Area Network (LAN), Wide Area Network (WAN), wireless network or the Internet through a variety of connections including, but not limited to, standard telephone lines, LAN or WAN links, broadband connections, wireless connections, or some combination of any or all of the above.

Server 110 includes an on-demand software 112 for a user to access via browser application 102. Server 110 further includes a report generator 114, a monitor tool 116, and optionally metric tool 118. The functions carried out by the report generator 114, monitor tool 116 and metric tool 118 may be alternatively carried out by only one tool module or any number of tool modules. Monitor tool 116 may be Customer Relationship Management (CRM) software, custom code, or a combination thereof. CRM software may be, but is not limited to, any one of the following, Siebel from Siebel Systems, Inc., Salesforce CRM from Salesforce.com, SAS Customer Intelligence from SAS Institute Inc. or the like. Monitor tool 116 is capable of monitoring usage of the on-demand software 112 at computational device 100. Alternatively, metric tool 118, such as the one introduced in patent application Ser. No. 11/191,344, titled "Measuring Productivity and Quality in Model-Based Design", which is incorporated herein by reference, may be used to collect some or all of the usage metric of the on-demand software 112. Report generator 114 generates reports using data gathered by monitor tool 116 and/or metric tool 116. The generated report may then be sent to a designated report receiver, such as a developer or a sales representative. Server 110 has access to database 120 where a vendor may stores user profiles from on-demand trials, seminars, webinars, pre-release testing, registered licensed software, and the like.

The illustrative embodiments are described solely for illustrative purposes relative to Simulink® software products from The Mathworks, Inc. of Natick, Mass. Although the illustrative embodiments will be described relative to a Simulink®-based application, however, one of ordinary skill in the art will appreciate that the present invention may be applied to other software applications and Simulink® is merely used as an example to show how much detail information and data may be collected and used in the present invention.

Figure 2:
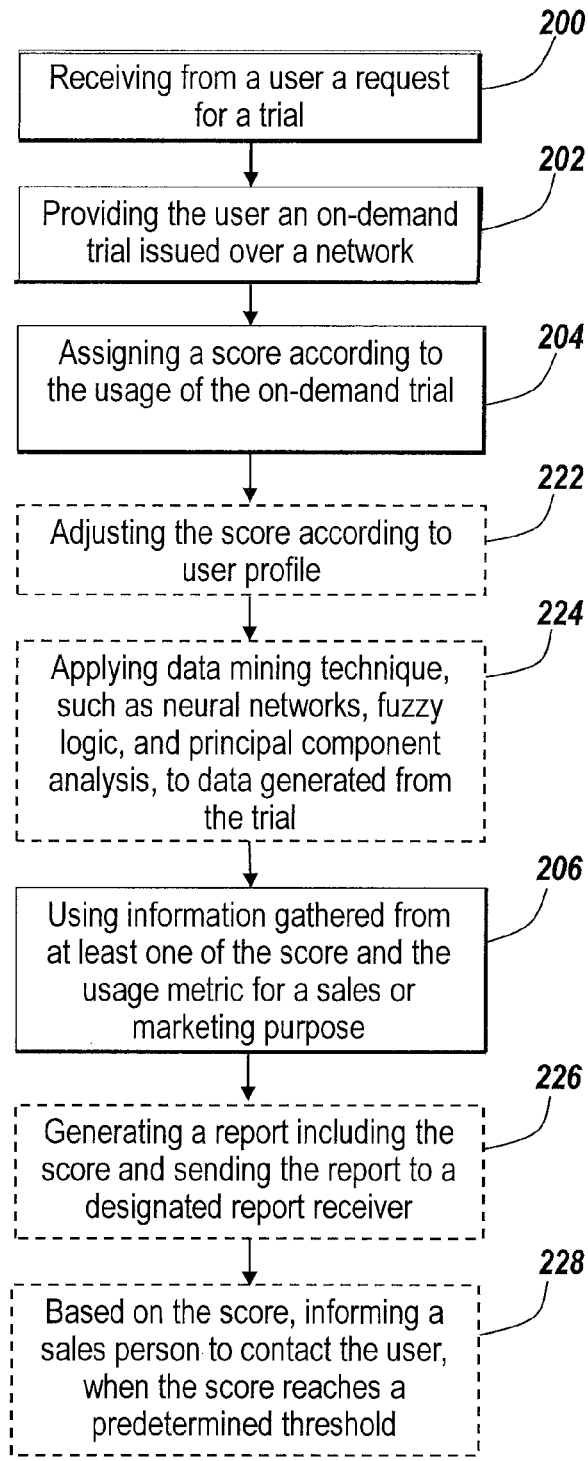
FIG. 2 shows the steps taken to practice one embodiment of the present invention.

FIG. 2 illustrates steps taken to practice one embodiment of the present invention. Once a vendor receives a request from a user asking for a trial in step 200, the vendor provides the user with an on-demand trial issued over a network in step 202. For example, a user goes to a vendor's website and fills out a form to request a trial. The trial may include one or more software products. The form may allow a user to schedule a trial at a specific time in the future. The form may also ask a user to fill out one or more contact information so that a sales representative may contact the user. FIG. 3 illustrates an exemplary form that a vendor may ask a user to fill out to request for a trial. Form 300 includes contact information section 302 and additional information section 304. Contact information section 302 may include a salutation field followed with a first name field, a middle name field, and a last name field. Contact information section 302 may also include fields inquiring about the user's employment, such as title, department, and company/university. Contact information section 302 may also include fields for the user to enter a mailing address, email address, telephone number, and fax number. One or more fields in contact information section 302 may be indicated as "required" on the form 300. Additional information section 304 may include specific questions regarding information that the vendor is particularly interested in knowing. For example, for The MathWorks, Inc. of Natick, Mass., they might be interested in knowing if the user has used their products, such as MATLAB®, and how often or how long the user has been using their products. The vendor may also inquire about other related products that the user may or may not be using. Form 300 further includes a submit button 306 for a user to click on once the user is ready to request a trial after filling out form 300.

To start the trial, the vendor may provide the user with a link and optionally a temporary license for the trial. In one embodiment, the vendor may control the amount of time the user may use the trial by disconnecting the connection between the server that hosts the trial software application with the user's computer. In another embodiment, the vendor may issue the user a temporary license that will expire after a pre-determined amount of time. In yet another embodiment, a license may be checked out automatically upon a user logging into the trial session.

Monitor tool 116 assigns a score according to a usage metric of the on-demand trial in step 204. The usage metric may include a list of software products the user used in the trial. The usage metric may further include the amount of time the user spent on trying each of the software products included in the trial. Monitor tool 116 may keep a log that records the start time and end time of a product usage during the user's trial. The usage metric may also include the types of demos that are reviewed by the user. The usage metric may further include blocks in a block diagram model, such as, Simulink® blocks that are used in the trial. The usage metric may further include names that the user uses to name an element of a model, a subsystem, or a block, such as signals, parameters, annotations, model dependencies, and the names of the model, subsystem, and the block itself. A model dependency can be an initialization script that is automatically executed when a model is loaded or a data structure that is stored in a header file and later used for bus data. The usage metric may further include product features that are used in the trial. These usage metric data may allow a vendor to get an idea of the user's area of interest, and therefore the vendor may be able to offer additional products or information that would be helpful to the user on deciding what products to purchase. The usage metric may be gathered using monitor tool 116. Usage metric may also be collected and monitored using metric tool 118. Additionally, monitor tool 116 may be customized to gather vendor specific interest data.

The usage metric may be monitored and collected using a client side control that gets downloaded to the user's browser application 102 when the user starts the trial. The client side control may log all input device activities, such as keystrokes and buttons pressed. The client side control may then send the logged data back to the server 110 either in real time, delayed, or after the trial is finished. Besides from input device activities, specific data relevant to the on-demand software 112 may also be tracked, such as unique features of the on-demand software 112.

Once specific usage data is gathered from the user's trial, the monitor tool 116 may apply data mining techniques, such as neural networks, fuzzy logic, or principal component analysis, to obtain a score for the specific usage data (step 224). Monitor tool 116 may also use the data mining techniques to map usage data onto an industry model or application model, such as automotive, aerospace, finance, etc. For example, names of blocks used in Simulink® may indicate to a sales representative what industry background the user is from. Data mining techniques may then be used to map names of blocks to an industry model. If a vendor knows that a certain usage data or a combination of certain usage metric data and user profile data indicate a strong interest in buying at least one product from the trial, the monitor tool 116 may inform a sales representative in real time or delayed once it detects such one or a combination of certain usage data. For example, if an automotive demo or the automotive demo plus a location of Detroit, indicates to the vendor that a user reviewing this demo would have strong interest in buying a product, then the monitor tool 116 may immediately send a sales representative a notification, such as an email, when a user clicks on the automotive demo to review. The sales representative may then have the option to contact the user immediately and possibly enhance the user's trial experience.

Besides usage metric, monitor tool 116 may also assign or adjust a score with respect to a user profile in step 222. FIG. 4 illustrates an exemplary user profile 310 that is stored in database 120. User profile 310 includes a profile table 312 that may include all the information that a user provides in form 300, such as name, email address, job title, company/university, etc. Profile table 312 may further include access number that the user used to participate in the trial. Profile table 312 may include user locale of the user requesting the trial. Users from certain countries, states, or cities may receive a higher weighting in score based on a variety of factors. For example, if the vendor sells a lot of products to automotive industry users, the vendor would most likely want to follow up with a user from Detroit sooner than a user from Montana, since the user from Detroit would more likely be an automotive user than the user from Montana. Profile table 312 may also include information regarding the industrial background of the user. Industrial background may be given explicitly by the user when the user signs up for a trial or obtained from database 120 if the user is an existing customer or a previous trial user. Profile table 312 may further include information regarding applications that the user is interested in. The database may contain user profiles from users who attended seminars, webinars, or tradeshows that the vendor hosted or participated in. Profile table 312 may also include history of product usage if the user is an existing user or a previous trial user, since the vendor would know what licenses the user has had or trials that they have run.

Profile table 312 may further include a list of products purchased, products reviewed on previous occasions, products used in pre-release trials, and a list of products under maintenance. Profile table 312 may also include types of technical support questions that the user has asked. Monitor tool 116 may log all technical support questions and associate with an active license and/or a user. Monitor tool 116 may use data mining techniques to map each technical support questions to gauge a user's level of usage and industrial background. Similarly, profile table 312 may also include a list of user requested product information which may have been recorded by monitor tool 116. Profile table 312 may also include information regarding intended product usage as indicated by a user. At the start of a trial, some questions may be asked about the user's intended product usage and the user's answer may affect the overall score of the trial. Similarly, some questions may be asked of the user during and after the trial and the answers may affect the overall score of the trial. The overall score may also be affected by information regarding other software installed on the user's computer as well as configuration information of the user computer system, which may also be included in the profile table 312. Additionally, data mining techniques may be applied on usage metric and/or user profile to identify other products that the user might be interested in so that a sales representative may contact the user and advertise these identified products.

After data are generated from the trial, data mining techniques may be applied to the data in step 224. As described above, data mining techniques may be used to generate a score. Data mining techniques may also be used to map data to an industry model or an application model. Data mining techniques may also be used to gauge a user's interest and level of skill. One of ordinary skill in the art will appreciate that data mining techniques may be used in many different ways to obtain useful data for a vendor to assess the user's interest in buying a product from the vendor. In step 206, information gathered from the score or the usage metric can be used for a sales purpose. In step 226, a report may be generated and sent to a designated report receiver, such as a sales representative, a company representative, a developer, a product analyst, where the report includes a score of the trial and other related data. The designated report receiver may be chosen depending on the intended usage of the collected information.

In one embodiment, during a user's trial, monitor tool 116 may continuously keep an updated score, and once the score has reached a threshold, monitor tool 116 may simply notify a sales representative to contact the user of the trial immediately (step 228). In another embodiment, monitor tool 116 may inform report generator 114 to send a notification (step 226), such as an instant message, email, or phone call, to a sales representative and optionally include a report that contains trial data up to the time the score has reached the threshold. In this manner, the sales representative may contact a user while the user is still running the trial; hence the present invention drastically shortens the time between trials and follow-up for good sales leads. One of ordinary skill in the art will appreciate that the notification may be either automatic or manual, digital or analog, electronic, optical or any combination thereof. One of ordinary skill in the art will also appreciate that many different entities may be used to send out a notification, such as monitor tool 116, report generator 114, other tools or modules on server 110, a separate electronic or computing device, or even a person.

Once a user's trial is over, monitor tool 116 sends the usage metric data to report generator 114. If the score reaches a pre-determined threshold, report generator 114 informs a sales representative so that the sales representative may contact the user as soon as possible in step 206. Additionally, the report generator 114 may perform additional data processing, such as statistical analysis, on the usage metric data from all the trials and provide the vendor additional analytic data.

FIG. 5 illustrates an exemplary on-demand trial report generated by report generator 114. Trial report 208 includes a score 210 and recommended next step 212 for the sales representative to do. Trial report 208 further includes user information table 214 and trial specific data table 216. User information table 214 includes data such as name and address of the user, access number of the user, licenses checked out for the trial, a list of products that the user currently owns licenses for. User information table 214 also contains a list of additional information on products requested by the user. Trial specific data 216 includes the length of the trial, a list of products that the user has tried and the length of time the user spent on each of the products. Trial specific data 216 also contains data on industry profile and application profile. Industry profile may either be explicitly given by the user, retrieved from a database, or results yielded by analysis of usage metric and/or user profile using data mining technique. Application profile may include demo viewed by the user and other analytical data resulting from applying data mining techniques on the usage metric and/or user profile. The examples given here are merely for illustrative purposes and are not meant to limit the scope of the present invention.

Figure 6:
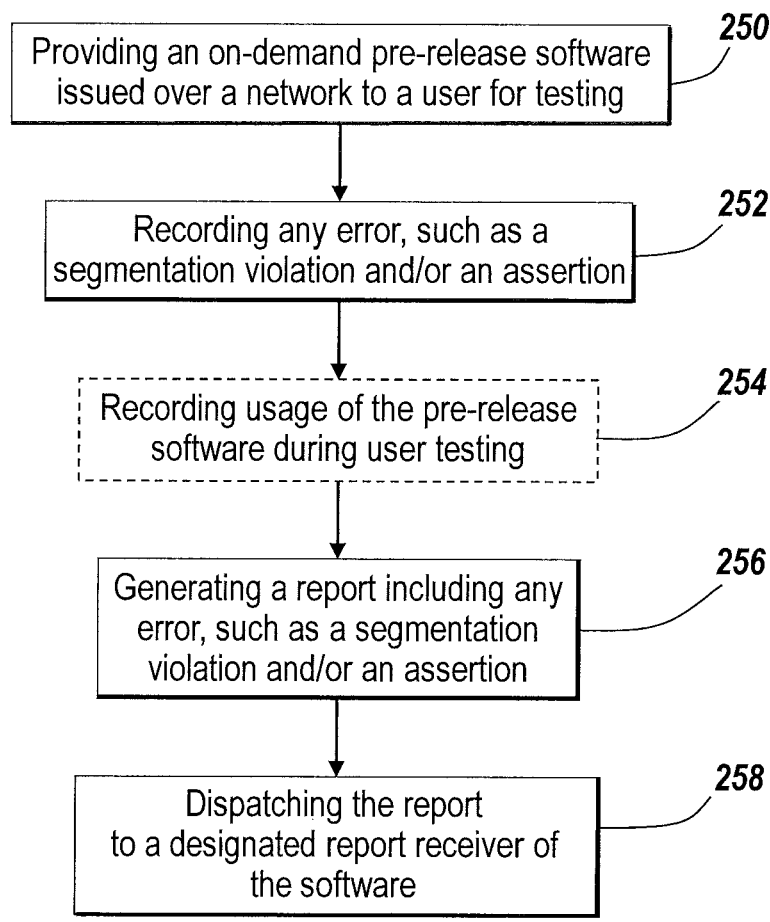
FIG. 6 shows the steps taken to practice another embodiment of the present invention.

FIG. 6 illustrates steps taken to practice another embodiment of the present invention. A vendor provides an on-demand pre-release software product issued over a network to a user for testing in step 250. Prior to starting the testing of the pre-release software, the vendor may ask the user to fill out a form including personal information, such as name, email address, etc. During the testing of the pre-release software, monitor tool 116 records any errors in step 252. An error may be, but is not limited to, an anomalous and erroneous behavior, such as numerical solver inconsistencies, failure to compile generated code, software application aborted abnormally, incompatibility of the current version of the software application with a model saved with a previous version of the software application, excessive time spent in zero-crossing detection during simulation, repeated usage of certain User Interface elements, and locking up of the User Interface. One of ordinary skill in the art will appreciate that any error that can be detected can be recorded. In this manner, the vendor will always have feedback of the pre-release software product without the user actively reporting any errors.

Monitor tool 116 may also record usage of the on-demand pre-release software in step 254. Usage of the pre-release software may include a log to capture all blocks and functions used in Simulink®, buttons pressed, keyboard inputs, features used, etc. Data in such a log may be included in a report that enables a developer to reproduce a segmentation violation or an assertion without relying on the user to remember what the user did in the pre-release testing. Monitor tool 116 may also monitor the creation of crash reports and link them to relevant usage by listing all commands and features being used at the time of the crash. In this manner, the developer may better understand how an error occurs and such an understanding would help the developer in fixing bugs that exist in the pre-release software. Report generator 114 generates a pre-release report including recorded errors, such as the segmentation violation and/or an assertion, in step 256. Report generator 114 may also include in the pre-release report usage of the pre-release software so that a developer can study how a segmentation violation or an assertion occurs. Report generator 114 then dispatches the report to a designated report receiver, such as a developer, a company representative, or a product analyst, to review the pre-release report in step 258. Reports may be sent in real time when an error occurs or the reports may be sent after some delay, for example, when the user has finished the testing of the pre-release software and logged out of the system. One of ordinary skill in the art will appreciate that prerelease reports may also be generated using the same methods as the generation of on-demand trial reports. One of ordinary skill in the art will also appreciate that the report may be automatically dispatched to a designated report receiver, or a report may be chosen manually to be sent to the designated report receiver.

FIG. 7 illustrates an exemplary pre-release report that is suitable to practice with one embodiment of the present invention. Pre-release report 260 includes a table 262 including the user's personal information, error and usage information. Table 262 includes the user's name, user's email address, user's access number, pre-release sponsor, and a list of pre-release products that the user tested. Table 262 also includes error information, such as segmentation violations and assertions, so that a developer may be automatically informed of such errors without the user actively reporting the errors. Table 262 further includes usage information, such as duration of use and model metric report including usage metric of the pre-release software.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed are:

1. A method comprising:
providing, using a computing device and over a network, access to an on-demand pre-release version of a software product to a user computing device of a user for testing of the on-demand pre-release version of the software product,
the access being provided without installing a copy of the on-demand pre-release version of the software product on the user computing device of the user;
forwarding, using the computing device, a client side control to the user computer device for installation on the user computing device;
receiving, using the computing device, results of the testing via the client side control,
receiving the results including:
tracking, using the client side control, usage of the on-demand pre-release version of the software product by the user,
the usage including two or more of:
information identifying an amount of time spent by the user during the testing of the on-demand pre-release version of the software product,
information identifying a feature of the on-demand pre-release version of the software product used during the testing of the on-demand pre-release version of the software product, or
information identifying one or more other software products tested by the user;
recording, using the computing device, an error, in connection with the usage of the on-demand pre-release version of the software product, among the results received via the client side control,
the error being recorded without a request from the user to record the error,
the error including a segmentation violation or an anomalous behavior;
generating, using the computing device, a report including:
information identifying the usage, and
information identifying the error; and
transmitting, using the computing device, the report from the computing device to a device of another user,
the report being transmitted to the device of the other user for the other user to reproduce the error,
the other user being a software developer or a product analyst associated with the software product,
the other user being different than the user.

2. The method of claim 1, where the error further includes: an assertion.

3. The method of claim 1, further comprising:
recording the usage of the on-demand pre-release version of the software product,
where the usage further includes at least one of a keystroke, a button pressed, or information identifying the feature used.

4. The method of claim 1, where the usage further includes:
information identifying one or more crashes of the on-demand pre-release version of the software product during the testing, and
information identifying one or more commands or one or more features being used during the one or more crashes.

5. The method of claim 2, where the report is transmitted to the device of the other user for the other user to reproduce the segmentation violation, the assertion, or the anomalous behavior.

6. The method of claim 2, where the error includes the anomalous behavior, and
where the anomalous behavior includes at least one of:
a failure to compile generated code,
information identifying a software application, relating the on-demand pre-release version of the software product, aborting abnormally, or
incompatibility of a version of the software application with a model saved with a previous version of the software application.

7. The method of claim 6, where the anomalous behavior further includes at least one of:
information identifying a repeated usage of one or more elements of a user interface associated with the on-demand pre-release version of the software product, or
information identifying a locking of the user interface.

8. A non-transitory computer-readable storage medium storing instructions, the instructions comprising:
a plurality of instructions which, when executed by a computing device, cause the computing device to:
provide, over a network, access to an on-demand pre-release version of a software product to a user computing device of a user for testing of the on-demand pre-release version of the software product,
the access being provided without installing a copy of the on-demand pre-release version of the software product on the user computing device;
forward a client side control to the user computing device for installation on the user computing device;
receive results of the testing via the client side control,
one or more instructions, of the plurality of instructions, to receive the results including:
one or more instructions to track, using the client side control, usage of the on-demand pre-release version of the software product by the user,
the usage including two or more of:
information identifying an amount of time spent by the user during the testing of the on-demand pre-release version of the software product,
information identifying a feature of the on-demand pre-release version of the software product used during the testing of the on-demand pre-release version of the software product, or
information identifying one or more other software products tested by the user;
record an error, in connection with the usage of the on-demand pre-release version of the software product, among the results received via the client side control,
the error being recorded without a request from the user to record the error,
the error including an anomalous behavior;
generate a report including information identifying the error; and
transmit the report to a device for another user that is different than the user,
the report being transmitted to the device of the other user for the other user to reproduce the error,
the other user being a software developer or a product analyst associated with the on-demand pre-release version of the software product.

9. The medium of claim 8, where the error further includes:
a segmentation violation, or
an assertion.

10. The medium of claim 8, where the instructions further comprise:
one or more instructions to record the usage of the on-demand pre-release version of the software product,
where the usage further includes at least one of a key stroke, a button pressed, or information identifying the feature used.

11. The medium of claim 9, where the report is transmitted to the device of the other user for the other user to reproduce the segmentation violation, the assertion, or the anomalous behavior.

12. The medium of claim 8,
where the anomalous behavior includes at least one of:
a failure to compile generated code,
information identifying a software application, relating the on-demand pre-release version of the software product, aborting abnormally, or
incompatibility of a version of the software application with a model saved with a previous version of the software application.

13. The medium of claim 12, where the anomalous behavior further includes at least one of:
information identifying a repeated usage of one or more elements of a user interface associated with the on-demand pre-release version of the software product, or
information identifying a malfunction of the user interface.

14. The medium of claim 8, where the usage further includes:
information identifying one or more malfunctions of the on-demand pre-release version of the software product during the testing, and
information identifying one or more commands or one or more features being used during the one or more malfunctions.

15. A system comprising:
a server to:
provide, over a network, access to an on-demand pre-release version of a software product to a user computing device of a user for testing of the on-demand pre-release version of the software product without installing a copy of the on-demand pre-release version of the software product on the user computing device;
forward a client side control, relating to the testing of the on-demand pre-release version of the software product, to the user computing device for installation on the user computing device;
receive results of the testing via the client side control,
when receiving the results of the testing, the server is to:
track, using the client side control, usage of the on-demand pre-release version of the software product by the user,
the usage including two or more of:
information identifying an amount of time spent by the user during the testing of the on-demand pre-release version of the software product,
information identifying a feature of the on-demand pre-release version of the software product used during the testing of the on-demand pre-release version of the software product, or information identifying one or more other software products tested by the user;

record an error, in connection with the usage of the on-demand pre-release version of the software product, among the results received via the client side control, the error being recorded without a request from the user to record the error, the error including an anomalous behavior;

generate a report including information identifying the error; and transmit the report to a device of another user that is different than the user, the report being transmitted to the device of the other user for the other user to reproduce the error, the other user being a software developer or a product analyst associated with the on-demand pre-release version of the software product.

16. The system of claim 15, where the error further includes a segmentation violation or an assertion, and where the report is transmitted to the device of the other user for the other user to reproduce the segmentation violation, the assertion, or the anomalous behavior.

17. The system of claim 15, where the error includes a plurality of:

a failure to compile generated code, information identifying a software application, relating the on-demand pre-release version of the software product, aborting abnormally, incompatibility of a version of the software application with a model saved with a previous version of the software application, information identifying a repeated usage of one or more elements of a user interface associated with the on-demand pre-release version of the software product, or information identifying a malfunction of the user interface.

18. The system of claim 15, where the usage further includes:

information identifying one or more crashes of the on-demand pre-release version of the software product during the testing, and information identifying one or more commands or one or more features being used during the one or more crashed.

* * * * *